Aug. 21, 1962   W. L. DRAYER   3,049,865
TURBOCHARGER CONTROL MEANS
Filed Feb. 19, 1960

INVENTOR.
William Drayer
BY
E. W. Christen
ATTORNEY

United States Patent Office 3,049,865
Patented Aug. 21, 1962

3,049,865
TURBOCHARGER CONTROL MEANS
William L. Drayer, Warren, Mich., assignor to General Motors Corporation, Detroit, Mich., a corporation of Delaware
Filed Feb. 19, 1960, Ser. No. 9,961
1 Claim. (Cl. 60—13)

This invention relates to supercharging an internal combustion engine and more particularly to a control system for a turbocharging system enabling the efficiency and operability of the supercharging system to be greatly increased.

In the supercharging of internal combustion engines it is common practice to use a turbine driven compressor to compress the air for introduction into the engine intake manifold. Such turbines may be driven by the exhaust gases coming from the internal combustion engine, the turbine driving the compressor in any conventional manner. In some turbocharging systems it is desirable to provide engine supercharging only during periods of peak power demand, or the like, and in accomplishing this result the general practice is to provide a separate nonsupercharged inlet to the engine intake control. When this is done, the compressor and turbine are inoperative, thus requiring a period of time for the compressor to build up a suitable pressure when supercharging is required. The time lag due to compressor pressure buildup is particularly objectionable when the operator of the vehicle requires the added power boost in a short period of time.

It is here proposed to decrease the time lag for compressor pressure buildup, between part throttle operation and full throttle operation, by means of a control system which includes, generally, a bypass conduit extending between the compressor inlet conduit and the compressor outlet conduit, and throttle valve means suitably disposed in the bypass conduit and the compressor inlet conduit and operatively connected to open and close together. With a system of this nature it is possible to decrease the amount of air flowing to the compressor and allow the compressor to reach high rotational speeds during part throttle or bypass operation, such that when the supercharging is required, the high rotational speed of the compressor will permit the compressor to supercharge the air without the heretofore found time lag.

A further requirement which may be necessary, depending upon the speeds required by the engine and the turbine, is a control system for preventing the overspeeding of the turbine relative to the turbine supercharge speed. This is accomplished by means of a pressure ratio control system attached to the turbine waste gate and controlled by the inlet pressure to the turbocharging compressor.

The above described control system is relatively simple and could be adapted to existing turbochargers without excessive modifications and changes therein.

These and other advantages will become more apparent from the following description and drawings in which.

Figure 1:
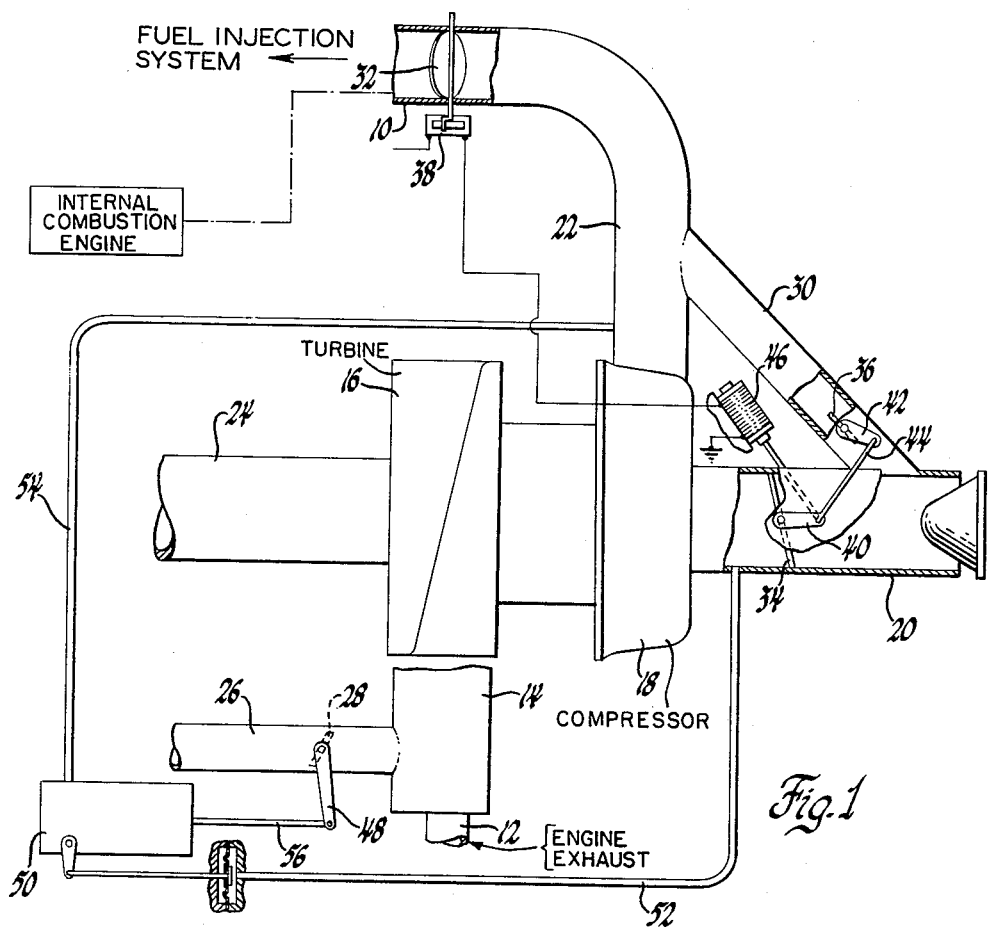
FIGURE 1 is a schematic illustration of the turbocharger and the control system embodying the invention.

Referring more particularly to the drawings, FIGURE 1 best illustrates the turbocharging system and the control system therefor. A conventional internal combustion engine, which is not shown, is provided with a suitable fuel injection system to which is connected the air inlet conduit 10. The engine may also be provided with an exhaust manifold to which is connected a suitable exhaust conduit 12 for conveying the exhaust gases from the engine to a collector chamber 14 and thence in any suitable manner to a turbine, illustrated schematically at 16.

The turbine 16 is adapted to drive a compressor 18 which compresses air entering the compressor from an inlet conduit 20. The compressor outlet conduit 22 leads to the engine intake conduit 10 and thence to the fuel injection system.

A turbine exhaust conduit 24 is suitably connected to the turbine 16 and is adapted to convey the turbine exhaust gases to the atmosphere. A bypass exhaust conduit 26 is connected to the collector chamber 14 and has a waste gate valve 28 disposed therein for regulating the amount of exhaust gases that are to be conveyed to the turbine 16. The bypass exhaust 26 and waste gate 28 are conventional.

In order to limit the amount of air flowing to the compressor 18 during part throttle operation of the internal combustion engine, a bypass conduit 30 is disposed between the compressor inlet conduit 20 and the compressor outlet conduit 22. The bypass conduit 30 is adapted to convey the air directly from the inlet conduit 20 to the outlet conduit 22 without passing the air through the compressor 18.

A throttle valve 32 is disposed in the conduit 10 and may be connected in any suitable manner for operation by the vehicle operator. The throttle valve 32 is adapted to regulate the amount of air flowing through the inlet conduit 10 and to the vehicle engine. A second throttle valve 34 is disposed in the compressor inlet conduit 20 and downstream of the inlet to the bypass conduit 30 and is adapted to regulate the amount of air flowing from the inlet conduit 20 to the compressor 18. A third throttle valve 36 is disposed in the bypass conduit 30 for regulating the amount of air flowing therethrough.

In order to coordinate the operation of the three throttle valves 32, 34 and 36, a microswitch, or the like, 38 may be disposed near, and operated by, the engine inlet throttle valve 32. A link 40, rotatable with throttle valve 34, and a link 42, rotatable with throttle valve 36, are connected by a connecting rod 44 for joint operation. A solenoid 46, connected in any suitable manner to the microswitch 38 and actuated thereby, is secured to the connecting rod 44 and/or the linkage 40, or the linkage 42, such that when the solenoid 46 is operated by the microswitch 38 the throttle valves 34 and 36 will operate together. The setting of the throttle valves 34 and 36 is such that when one is fully closed the other is fully opened.

It is to be understood that a mechanical linkage may be used, as well as the electrical linkage illustrated, to coordinate the operation of the three throttle valves.

Thus, assuming throttle valve 36 to be fully opened and throttle valve 34 to be fully closed, the position illustrated in FIGURE 1, all of the air entering the inlet conduit 20 will pass through the bypass conduit 30 without going through the compressor 18. Similarly, when the throttle valves are reversed, all of the air entering the inlet conduit 20 will pass through the compressor and none of the air will pass through the bypass conduit 30.

By throttling the inlet to the compressor and providing a bypass for part throttle operation of the engine, it may be seen that during part throttle operation and when the inlet conduit 20 is closed by the throttle valve 34, the compressor 18 will be doing no work and the turbine 16 will be rotating due to the engine exhaust gases flowing therethrough. Since the compressor 18 is doing no work, higher rotational speeds of the compressor may be attained. When supercharging is required, throttle valve 34 is opened and throttle valve 36 closed, the compressor rotating at a high rotational speed will not require a substantial period of time in order to compress the incoming air to the proper pressure. Thus, the engine supercharge is more readily available when desired by the operator.

When throttling the inlet to the compressor, and when the compressor reaches high rotational speeds, the turbine speed may exceed the full throttle supercharge turbine speed and cause momentary overpressure and heavy knock in the internal combustion engine when the supercharging is applied. In order to overcome this condition, a part throttle turbine speed control is provided in the waste gate control system. The waste gate valve 28 is provided with a link 48, which is operated by a suitable pressure ratio control device, illustrated schematically at 50. The pressure ratio control device is dependent upon the pressure depression at the inlet to the compressor 18 and is measured by a pressure tap conduit 52 opening into the compressor inlet conduit 20 downstream of the throttle valve 34. A second pressure tap conduit 54 extends from the compressor outlet conduit 22 to the pressure ratio control device 50 so that a differential pressure is provided. The differential pressure is adapted to actuate a rod 56 in any suitable manner, which is connected to the link 48 and the waste gate valve 28. When the pressure depression at the compressor inlet reaches a predetermined value, due to the speed of the turbine 16 and the compressor 18, the waste gate valve 28 will be opened by the pressure ratio control device 50 and the linkage 56, 48, to bypass a sufficient amount of the exhaust gases which drive the turbine 16 and prevent the turbine from overspeeding. During those periods when the engine is being supercharged, that is, when the throttle valve 34 is opened and the throttle valve 36 is closed, there is no pressure depression at the compressor inlet and the turbine speed control is inoperative.

Figure 2:
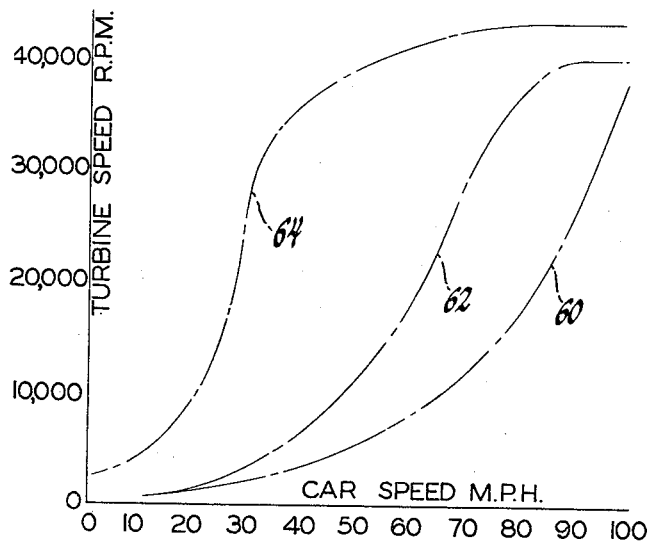
FIGURE 2 is a plot of Turbine Speed versus Car Speed which indicates the extent of the improvement in turbine speed using the control system illustrated in FIGURE 1.

FIGURE 2 is a plot of turbine speed versus car speed, indicating the extent of the improvement in turbine speed using the turbocharger control system as above set forth. Turbine speed in revolutions per minute is plotted on the vertical axis and car speed in miles per hour is plotted on the horizontal axis. The curve illustrated by numeral 60 shows the relationship of turbine speed to car speed under road load conditions, when there is a single throttle to regulate the flow of air to the internal combustion engine. This is the usual turbocharger construction. The curve illustrated by numeral 62 shows the relationship between turbine speed and car speed during road load conditions, with the control system above set forth. It may be seen that the control system and unloaded compressor approximately doubles the turbine speed when compared to the single throttle system when the compressor is loaded.

The curve illustrated by numeral 64 shows the relationship between turbine speed and car speed during acceleration of the vehicle with the control system above set forth. Curve 64 illustrates the maximum speed of the turbocharger as set by the pressure ratio control system. The extent of improvement in turbocharger speed may be noted by the proximity of curve 62 to curve 64, as compared to the proximity of curve 64 to curve 60.

Thus, a turbocharger control system is provided which enables the vehicle operator to gain the advantages of supercharging during peak demands without the objectionable time lag required for compressor pressure buildup following part throttle operation.

What is claimed is:

Control means for an engine turbocharger having a compressor and a turbine driven by exhaust gases from said engine and comprising a compressor inlet conduit, a compressor outlet conduit, valve means in each of said conduits for regulating the amounts of air flowing therethrough, a bypass conduit extending between said compressor inlet conduit and said compressor outlet conduit and upstream of each of said valve means therein, valve means in said bypass conduit for regulating the amount of air flowing therethrough, a microswitch actuated by said valve means in said compressor outlet conduit, a linkage operatively connecting said valve means in said compressor inlet conduit and said valve means in said bypass conduit for coordinated operation thereof, a solenoid operatively connected to said microswitch and to said linkage for operating said linkage upon actuation of said microswitch for regulating the proportion of air flowing therethrough to decrease the work load on said compressor during part throttle operation of the engine and decrease the compressor pressure buildup time period.

References Cited in the file of this patent

UNITED STATES PATENTS

| | | |
|---|---|---|
| 1,663,936 | Cozette | Mar. 27, 1928 |
| 2,374,708 | Shoults | May 1, 1945 |
| 2,565,482 | Dolza et al. | Aug. 28, 1951 |
| 2,651,910 | Zakarian | Sept. 15, 1953 |
| 2,656,675 | Coar | Oct. 27, 1953 |
| 2,956,585 | Alsworth et al. | Oct. 18, 1960 |